Feb. 14, 1967        R. S. COHEN        3,303,823
WEIGHT CONTROL APPARATUS FOR ANIMALS
Filed Aug. 2, 1965
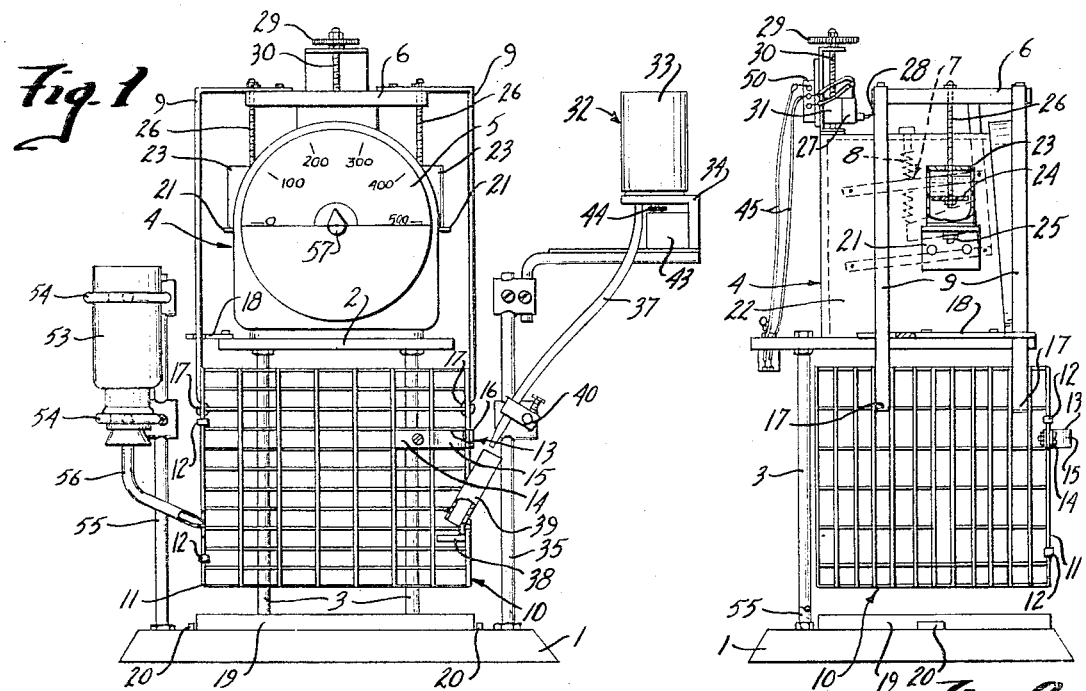
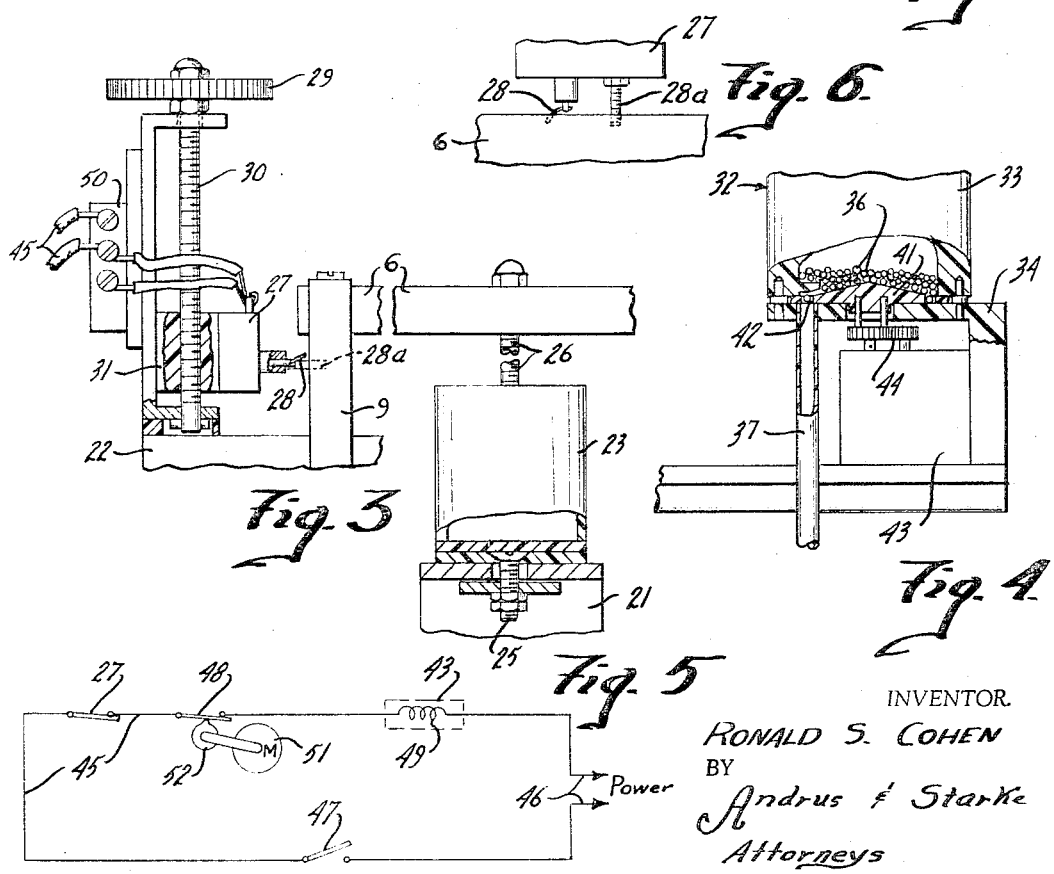
INVENTOR.
RONALD S. COHEN
BY
Andrus & Starke
Attorneys 3,303,823
WEIGHT CONTROL APPARATUS FOR ANIMALS
Ronald S. Cohen, Milwaukee, Wis., assignor to Modern Teaching Associates, Inc., Milwaukee, Wis., a corporation of Wisconsin
Filed Aug. 2, 1965, Ser. No. 476,359
13 Claims. (Cl. 119—51.11)

This invention relates to a weight control apparatus for animals and is adapted to continuously control the weight of an animal within defined limits of a feeding and target weight and particularly has reference to a combination cage and scale arrangement in which the cage for confining the animal is suspended from the scale and the obtaining of a predetermined feeding weight by the animal actuates the scale to automatically effect the supplying of food to the confined animal to bring the animal to the target weight which has been established for the animal.

It has been common practice in experimental psychology to use a variety of procedures to produce drive or motivation in animals for experimental purposes. These procedures, among others, include feeding the animals on interval feeding schedules or feeding them at extended time intervals limited amounts of food computed to keep them at a constant weight, or feeding them water but depriving them of food. Such operations are carried out for the purpose of using food as the motivator in the experiment in that the food is employed as the reward for a correct performance. Thus, it is important that the hunger level of the animal be controlled and consequently control of the animal's body weight must be accomplished.

The present invention is directed to an apparatus which is reliable and stable for keeping the weight of an animal constant within low defined limits between a predetermined feeding weight and a target weight suitable for the experiments to be carried out with the animal. In general the invention comprises an ample living cage which is suspended from a sensitive platform scale having means to provide a reading of the animal's weight within the cage. A scale switch is adjustably mounted adjacent the edge of the scale and this switching mechanism may be set to establish the weight at which the animal is to be fed. Thus, when the weight of the animal confined within the cage falls below such established weight, the switching mechanism is actuated by the scale to operate a dispenser for controlled discharge of food to the confined animal.

In connection with the present invention, weight control can be obtained by providing unlimited amounts of water to the animal and feeding limited amounts of solid or relatively solid food when the animal's weight reaches feeding weight. A similar weight control can however also be obtained by providing an unlimited amount of a solid food at all times and providing controlled and limited amounts of water to the animal in response to weight variations. In either event the essential concept of providing weight control remains the same as generally the animal's intake of solid and liquid food are interrelated. Generally, the animal will not eat a solid food if there is no water made available, nor will the animal drink water if no solid food is made available.

In the following description where water and solid foods are referred to either may be fed of course as a mixture if desired and further additional forms of food may be interrelated or fed to the animal under certain desired conditions if so desired and proper compensation is made therefore in interpreting the results.

For purposes of illustration and description, the invention is described in connection with provision of unlimited amounts of water and intermittent provision of solid food pellets during a feeding period.

The discharge from the dispenser is controlled during a feeding period so that food is delivered at intermittent intervals such as every fifteen or thirty seconds. The animal will thereby be discouraged against the formation of any behavior or action pattern which it might follow in order to bring food.

The intermittent discharge of food pellets is accomplished by a timer switch which is closed intermittently by a continuously operating cam. After the scale switch is closed by the scale when the weight of the animal has dropped to the predetermined feeding level, the electrical circuit employed in the device is intermittently closed by the cam of the timer switch to consequently actuate a relay and thereby operate the food dispenser discharge gate or valve to an open position for discharge of food pellets. The vertical movement of the cage by the animal is dampened by dash pots and lateral movement is restricted by suitable guides to prevent the animal from affecting the scale by jumping up and down in the cage. In addition water is made available to the animal in the cage through a water bottle and spigot, without restricting movement of the cage by the changing weight of the animal nor permitting the animal leaning on the spigot to cause inaccurate scale readings.

Data from experiments with the weight apparatus of the invention wherein animals were maintained at a predetermined substantially constant body weight have shown greater distinction over results from previous procedures between levels of drive by the animals experimented with to obtain food as a reward and has resulted in less variability in performance. Thus, fewer animals are required for a particular experiment.

In the present invention, the animal is maintained in the cage until the desired weight has been reached and held for the selected period, if any, after which for the first time the animal is removed from the cage for experimental runs. This is permitted as a result of the direct readout provided by the scale in contrast to weight controls where an animal is removed from a living cage for weighing purposes. This is of significance in that the animal is provided with a consistent routine; i.e., every time he is removed, it is for the purpose of running an experiment for which he is rewarded.

By maintaining an animal at a substantially constant weight twenty-four hours a day rather than feeding the animal at extended periods of time, animals may be used in an experiment several times a day rather than having to wait until food has been withheld eight or twelve hours to motivate the animal by food. The device also is automatic except for replenishing the supply of food pellets and water every few days. It has also been found that every food pellet is completely eaten by use of the weight apparatus of the invention and no pellets are wasted.

Another advantage of the invention is that the cage becomes the sole living quarters for the animal and the ordinary type laboratory cage need not be provided. In addition the animals after an experiment are only fed if they are underweight. Consequently, an animal cannot affect the experiment by expecting to fall into the pattern of always being fed immediately upon return to its cage which tendency may develop with the usual handling of an animal, thereafter running it in an experiment and returning it to its home cage and feeding it.

Other objects and advantages of the invention will appear in the course of the following description and drawings.

In the drawings:
FIG. 1 is a front elevational view of the apparatus of the invention;

FIG. 2 is a side elevational view of the apparatus of FIG. 1;

FIG. 3 is a fragmentary side detailed view of a sensitive switch and scale;

FIG. 4 is an enlarged detailed section of a hopper and plate valve;

FIG. 5 is a view of a circuit employed to actuate the apparatus of the invention; and FIG. 6 is a fragmentary elevational view of a scale switch.

The weight control apparatus of the invention as illustrated in the drawing has a base 1 which may be a plate-like member of generally rectangular shape. A generally square support 2 is supported on the base 1 and a substantial distance above it by the horizontally spaced legs 3 which are bolted to the rear portions of both the base 1 and the support 2 so that the support 2 overhangs base 1.

A generally sensitive spring loaded platform scale 4, such as a dietetic platform scale is located on support 2 and is suitably secured thereto. Scale 4 includes a face 5 which is designed to read weight in grams or other suitable units and a platform 6 interconnected to a spring loaded pivotal lever arm assembly 7 employing a linear coil spring 8 for positioning of a pointer on scale 4 in accordance with the movement of platform 6.

The platform 6 of scale 4 is located at the top of scale 4 and four rigid metal support straps or bands 9 are secured to platform 6 at the respective four corners of platform 6 and extend downwardly therefrom below support 2 to a wire cage 10.

The wire cage 10 is provided for confining the animal to be experimented with and includes a door 11 through which the animal is placed in the cage. The door 11 is hinged at one side edge as at 12 and secured at the opposite edge by a single spring latch 13 which engages the adjacent wire of the cage. The latch 13 is formed with a base 14 which is bolted to the door 11 and includes a generally U-shaped handle grasp portion 15 integrally formed therewith. A latching lip 16 extends from the opposite end of portion 15 into latching engagement with the adjacent wire of the cage. This permits the attendant to open the door by grasping the outwardly projecting handle portion 15 for opening the door with one hand such that the other is free to handle the animal. The wire cage 10 is located below support 2 and the lower ends of the straps 9 engage and are secured as at 17 to one of the wires of cage 10 extending on the respective sides of the cage to suspend the cage in vertical alignment with the scale 4 for free vertical movement in the recess between the base 1 and overhanging support 2. One set of bands 9 passes through a guide 18 which may be of Plexiglas. The guide 18 overlies one of the side portions of support 2 to which the guide is secured and projects outwardly therefrom. The guide 18 limits the horizontal travel of the bands 9 and prevents the cage 10 from swaying from side to side.

The cage 10 is shown as of the mesh type formed by spaced generally rigid wire which is welded together. The spacing of the wire at the bottom of cage 10 permits droppings of the animal to fall through the bottom of the cage onto pan 19 which is confined on base 1 between suitable stops 20.

In order to inhibit the effect of gross vertical movement of cage 10 by the confined animal, brackets 21 are secured to each side of housing 22 of scale 4. A dash pot 23 is disposed on each bracket 21 by a suitable mounting bolt 25 which projects through an enlarged opening in bracket 21 and permits slight lateral or horizontal movement. The plunger 24 of each dash pot 23 is secured by a shaft 26 to the platform 6 of scale 4. Plunger 24 may be a small disc member of aluminum or the like and is of smaller diameter than the oil-filled housings to provide restricted peripheral flow of oil around the plunger 24. Consequently, rapid vertical movement of cage 10 by the animal is dissipated by the dash pot units before it is transmitted to scale platform 6.

The illustrated scale structure includes a slight arcuate movement of the platform as the weight changes. Consequently, the plungers 24 which are attached to the platforms 6 move in a corresponding manner. To prevent the dash pots from effecting the scale response, the dash pots 23 move horizontally and thus prevent adverse loading of the scale 4.

A normally closed sensitive snap-action switch or what may be described as the scale switch 27 is secured to the rear top portion of scale 4 adjacent to platform 6 and a trip lever 28 extends from switch 27 to a position beneath platform 6. The switch 27 may be of any suitable construction and preferably includes an operating differential such that the lever 28 must be moved through a selected vertical movement before it returns the switch 27 to the normally closed state.

The illustrated switch includes a rotatable mounting of the lever 28, as shown in FIG. 3. Further, lever 28 is preferably a wire-like element of suitable spring steel to permit transverse bending to vary the effective length of the arm and therefore the differential movement of the platform. This permits varying the target weight range. A safety stop member 28a which may be a switch mounting screw projects parallel to the operating shaft beneath platform 6 and limits the downward travel of platform 6 with respect to the switch. This protects the wire-like element or lever 28 which may otherwise be bent out of adjustment.

Switch 27 is adjustable vertically in micro increments to change the vertical position of lever 28 with respect to platform 6 of scale 4 and thereby establish the target weight at which the confined animal may be fed. This adjustment is accomplished by rotating disc 29 which rotates shaft 30 and raises or lowers support 31 of switch 27 and its lever 28. In this case, rotation of disc 29 clockwise will raise switch 27 and its associated trip lever 28 and rotation of disc 29 counterclockwise will lower lever 28.

The closing of switch 27 by trip lever 28 controls the discharge of feed pellets from the feed dispenser 32. Food dispenser 32 may be of various types such as pellet dispenser Model PD-109 which is sold commercially by Davis Scientific Instruments of North Hollywood, California. For purposes of illustration, the dispenser is more or less diagrammatically shown in FIGS. 1 and 4 and includes a main tubular hopper 33 which is secured to a support 34 disposed adjacent to the cage 10, in turn supported on the leg 35 which is bolted to base 1. The hopper 33 is located at a sufficient height on support 34 so that food pellets 36 may be discharged by gravity therefrom through the tube 37 to a food tray 38 which is secured to the inside of the cage 10 and has a tube 39 extending upwardly and outwardly therefrom to receive the lower end of tube 37 in spaced relation so that tube 39 will not interfere with the vertical movement of the cage by engaging tube 37. Tube 37 in turn is secured to leg 35 by the bracket 40.

The flow of pellets 36 from hopper 33 is controlled by a rotating plate valve 41 which is located between the hopper 33 and tube 37 and has a plurality of discharge apertures 42 for discharge of pellets 36. A stepping rotary solenoid 43 is coupled through gears 44 to rotate plate 41 in rapid steps for each energization of solenoid 43. The plate valve 41 is rotated in steps to move the portion with apertures into the hopper 33 and thereafter into sequential alignment with the upper end of the tube 37. The snap action of the plate valve 41 produces agitation of the pellets in the hopper and insures insertion of a pellet in each of the apertures. Plate valve 41 is actuated by solenoid 43 which is energized by scale switch 27 through the electric power circuit provided for the apparatus and illustrated in FIG. 5.

As may be observed in FIG. 5, the scale switch 27 is connected by leads 45 to the power source 46 through toggle switch 47 and is in series with timer switch 48 and solenoid winding 49 of solenoid 43. Leads 45 extend from switch 27 to toggle switch 47 which is connected to a terminal board 50 on a suitable support and thence is connected to power source 37. Solenoid winding 49 is connected to a ratchet drive, not shown, for moving the gears 44 and the plate valve 41 in discreet rapid steps. The timer switch 48 is provided for the purpose of feeding the animal at spaced intervals whenever the circuit is actuated by the feeding weight of the animal requiring food. Timer switch 48 has a motor 51 which is connected to a power source, not shown, and constantly rotates a cam 52 to intermittently close the contacts of switch 48 which is connected in series with switch 27 and winding 49. When the contacts of scale switch 27 are closed by disengagement of the platform 6 of scale 4 with trip lever 28, the electric circuit is actuated the next time contacts of timer switch 46 are closed. This intermittently actuates winding 49.

When solenoid winding 49 is actuated, the stepping mechanism moves to rotate the gears 44 and thereby rotate plate valve 41 and align the next single pellet-filled aperture with the tube 37. Pellets 36 then flow intermittently by gravity from hopper 33 through tube 37 to food tray 28 when timer switch 46 is closed by cam 52. When the winding 49 is deactivated, the solenoid resets for the next step.

Water is supplied to the animal from a water feeding bottle 53. The bottle is held by the double partial ring support 54 connected to a stand 55 which is bolted to base 1. A spigot 56 extends from the bottle to the cage 10 and terminates in a small opening from which water will not normally flow because of surface tension and a slight vacuum in the bottle 53. The animal may lick the end of the spigot to break the surface tension and obtain water. The spigot 56 does not engage the cage 10 to in any way effect movement of the cage and terminates at a position where the animal cannot hang onto it and thereby effect the weight transmitted to scale 4. The bottle and spigot can be readily removed by twisting them and pulling upwardly.

In order to enable the user to directly read the weight of the animal, the face 5 of the scale is provided with a fixed dial 57 which provides direct readout of the weight of the animal only.

An example of the weight control apparatus is described hereinafter in connection with an animal whose weight it is desired to control. As an example, a rat weighing 400 grams is placed in cage 10 and is to be reduced in weight to a target weight of 350 grams. The toggle switch 47 is closed to activate the electric current of the apparatus and the platform 6 is then depressed manually and held at a set weight of 340 grams which is 10 grams below the target weight of 350 grams. The 10 grams are provided for the actuating force of the switch which will vary between a lesser force and a maximum of ten grams as a result of its differential snap action in accordance with the well known operation of snap action switches. Normally a six gram differential is provided in the actuation of the switch by proper transverse positioning of the lever 28. The six gram differential is equally divided to opposite sides of the set weight to start and stop feeding at these limits. To position switch 27, the scale platform 6 is held at the upper limit of 343 grams and scale switch 27 is then brought up to have lever 28 meet platform 6 by rotating disc 29 clockwise. An audible click can be heard when the trip lever 28 engages platform 6 sufficient to open the switch. Platform 6 is slowly released and at approximately 337 grams the switch lever 28 has moved to permit the snap action switch 27 to move to the normally closed state. The scale 4 is thereby set to feed the rat when its weight reaches 337 grams. The switch closes and actuates the rotary solenoid. The latter intermittently rotates gate valve 41 to align a single pellet filled aperture with the tube 37 when cam 52 closes timer switch 48 and completes the circuit. The rat will continue to be fed until the weight of the rat reaches the upper weight limit of 343 grams at which time platform 6 will be depressed to engage lever 28 and trip switch 27. Thereafter the rat will lose weight until its weight again is reduced to the feeding weight of 337 grams.

The illustrated embodiment of the invention has disclosed a means for providing unlimited amounts of water and the feeding of a restricted and limited amount of food to a confined animal for purposes of weight control. As previously noted, the reverse situation can be provided wherein the water is fed in restricted amounts and unlimited amounts of solid food are presented. For example, in place of the pellet dispenser a suitable source of water might be provided and intermittently fed to the cage tray and thus made available to the animal whenever the weight responsive scale is properly actuated.

The form of liquid supply could take any desired means such as periodic introduction of a spigot, periodic positioning of a conventional water dipper through a suitable cam mechanism between a reservoir at a location near the cage through which the animal could take the water from the dipper.

One advantage associated with providing limited amounts of water may reduce the cost of feeding the animal because of the variation in the food source which could be employed. Thus, the solid food could be provided in a bulk form rather than in pellet form. As bulk food is somewhat less expensive than pellet food the food cost would be reduced. In such an instance of course the food product should be such that an animal cannot carry it into the cage and store it therein. For example, in the wire type cage illustrated, the bulk food should be in sufficiently small sizes but chopped up such that when it is brought into the cage it will fall through the floor. Once again the liquid feeding would be intermittently made for the same reasons the solid food was intermittently fed to the animal. In place of the water in the spigot, a suitable source of food such as enlarged pellets or the like would terminate in a suitable feeding tray to which the animal could project his head for eating purposes. In either event the arrangement should be maintained such that the animal cannot affect the scale recording or the position of the platform as a result of interengaging the feed mechanism.

The apparatus of the invention thus automatically controls the body weight of an animal within defined feeding and target weight limits very precisely and continuously over an extended period of time so that the animal may be used more effectively to carry out experiments.

Various modes of carrying out the invention are contemplated as being within the scope of the following claims particularly pointing out and distinctly claiming the subject matter which is regarded as the invention.

I claim:
1. Weight control apparatus for controlling the weight of an animal by providing restricted quantities of food in a first form and essentially unrestricted quantities of a second form, comprising
   a scale having a movable portion and a readout coupled to and actuated by the movable portion,
   a cage suspended from the movable portion and defining a living area for an animal to be used for experimental purposes,
   a source of the first form of food, and
   means responsive to the position of the movable portion to deliver food from the source to the cage to control the feed intake and the weight of the animal and the readout correspondingly, whereby said animal remains in the cage until the desired experimental weight control phase is completed.

2. Weight control apparatus for controlling the weight of an animal within defined limits by providing restricted quantities of food in one form and essentially unrestricted quantities of another form, comprising a spring loaded scale having vertically movable weighing means connected thereto to receive and effect the recording of the weight of the animal whose weight is to be controlled, a cage adapted to confine said animal with said cage being freely supported from the weighing means in vertical alignment therewith, means connected to the weighing means to dampen rapid vertical movement of the cage by the confined animal, a food holding means disposed adjacent to the cage and provided to dispense food to the animal and having discharge means for dispensing of food from the holding means, and switch means responsive to the position of the weighing means to deliver food from the holding means to the cage to control the weight of the animal and the indication thereof.

3. The control apparatus of claim 2 wherein said switch means includes an operating differential and a switch arm adjustably disposed in the path of the weighing means to adjust the effective length of the switch arm with respect to the weighing means.

4. The control apparatus of claim 2 wherein means are provided to restrict lateral movement of the cage relative to the scale.

5. Weight control apparatus for controlling the weight of an animal by providing restricted quantities of food in a first form and essentially unrestricted quantities of a second form, comprising a scale having an arcuately and vertically moving platform, a cage suspended from the platform, dash pot means having a housing secured to the scale and piston members secured to the platform, said housing being mounted for relatively free horizontal movement, a source of the first form of food, and means responsive to the position of the movable platform to deliver food from the source to the cage to control the weight of the animal and the readout correspondingly, whereby said animal remains in the cage until the desired experimental weight control phase is completed.

6. Weight control apparatus for controlling the weight of an animal within defined limits, comprising a spring loaded scale having a vertically movable top mounted weighing platform, a cage adapted to confine said animal, rigid strap means connected at one end to the weighing platform and extending downwardly on opposite sides of the scale with the lower ends connected to said cage and freely suspending said cage from the weighing means in vertical alignment therewith, a pair of damping means connected to the weighing means one each to opposite sides of the platform to dampen rapid vertical movement of the cage by the confined animal, guide means secured to the scale and having slots through which said straps freely pass, said slots restricting lateral movement of said strap means, food holding means disposed adjacent to the cage and provided to dispense food to the animal, valve means connected to the food holding means and adapted to effect dispensing of food from the holding means, and switch means connected to the valve means and disposed adjacent to said weighing means, said switch means being actuated by the weighing means when the weight of the animal confined in said cage obtains a predetermined amount and means responsive to actuation of the switch means to operate said valve means and effect dispensing of food to said animal from the food holding means.

7. The weight control apparatus of claim 6 wherein said scale platform has a slight arcuate movement in response to weight changes and each of said damping means comprises a fixed liquid filled tubular housing and a piston member having a smaller diameter than said housing and being slidably disposed therein and connected by an upwardly projecting piston rod to the platform.

8. Weight control apparatus for controlling the weight of an animal, comprising a spring loaded scale having vertically movable weighing means connected thereto to receive and effect the recording of the weight of the animal whose weight is to be controlled, a cage adapted to confine said animal with said cage being freely supported from the weighing means in vertical alignment therewith, means connected to the weighing means to dampen rapid vertical movement of the cage by the confined animal, a food holding means disposed adjacent to the cage and provided to dispense food to the animal, valve means connected to the food holding means to effect dispensing of food from the holding means, valve actuating means for operating said valve means, switch means connected to the valve actuating means and disposed adjacent to said weighing means for actuation by the weighing means when the weight of the animal confined in said cage obtains a predetermined amount, and a timer switch connected in series with said switch means and said valve actuating means for closing the valve means intermittently so that when the switch means is actuated the valve means is operated at predetermined intervals by the timer switch and the valve means intermittently so that when the switch said animal from the food holding means at predetermined spaced intervals of time as the animal's weight varies.

9. Weight control apparatus for animals for controlling the weight of an animal within defined limits, comprising a spring loaded scale having a vertically movable platform connected thereto to receive and effect the recording of the weight of the animal whose weight is to be controlled, a cage adapted to confine said animal, means secured to the cage and to said platform to freely suspend the cage from the platform and in vertical alignment with the platform, means connected to the weighing means to dampen rapid vertical movement of the cage by the confined animal, a food holding means disposed adjacent to the cage to dispense food to the animal by gravity feed, valve means connected to the holding means to effect flow of food from the holding means, a relay and armature disposed to open said valve, an adjustable snap-action switch connected in series with said relay and disposed adjacent to the weighing means for actuation by the weighing means when the weight of the animal confined in said cage obtains a predetermined amount, and a timer switch connected in series with the snap-action switch and said relay with said timer switch having a cam which rotates continuously when the apparatus is in use to intermittently open and close the timer switch so that when the snap-action switch is actuated the relay is activated intermittently when the timer switch is closed to complete the circuit and thereby actuate the armature and open the valve means to effect dispensing of food to said animal from the food holding means by gravity flow at predetermined spaced intervals of time.

10. Weight control apparatus for animals as defined in claim 9 wherein the means for suspending the cage from the platform comprises bands which are secured to the platform and to the cage.

11. Weight control apparatus for animals as defined in claim 9 wherein the means for suspending the cage from the platform comprises a plurality of metal bands secured to opposite sides of the platform and depending therefrom with the lower ends secured to the cage, and a horizontal guide plate mounted to one side of the scale and having guide slots with the bands freely passing therethrough to restrict lateral movement without appreciably effecting the movement of the cage and platform.

12. Weight control apparatus for animals as defined in claim 9 wherein the snap-action switch has a trip lever, and dial means to adjust the trip lever vertically with respect to the platform of the scale to determine the feeding weight for the confined animal.

13. Weight control apparatus for animals as defined in claim 9 wherein the snap-action switch is mounted to one side of the platform and has a rotatable trip lever extended beneath the platform, said trip lever being a wire-like element to permit lateral displacement beneath the platform for varying the effective fulcrum of the trip lever, and dial mean to adjust the trip lever vertically with respect to the platform of the scale to determine the feeding weight for the confined animal.

References Cited by the Examiner
UNITED STATES PATENTS

| | | | |
|---|---|---|---|
| 2,440,332 | 4/1948 | Francis | 119—53 |
| 2,661,122 | 12/1953 | Peterson | 119—14.17 X |
| 2,796,044 | 6/1957 | Breland | 119—29 |
| 2,814,271 | 11/1957 | Black | 119—55 |
| 2,886,000 | 5/1959 | Clegg | 119—14.27 |
| 3,011,476 | 12/1961 | Bell | 119—29 |

SAMUEL KOREN, *Primary Examiner.*

ALDRICH F. MEDBERY, *Examiner.*